United States Patent [19]

Viani

[11] 4,012,531
[45] Mar. 15, 1977

[54] PROCESS FOR EXTRACTING ANTIOXYDANTS

[75] Inventor: Rinantonio Viani, Attalens, Switzerland

[73] Assignee: Societe d'Assistance Technique Pour Produits Nestle S.A., Lausanne, Switzerland

[22] Filed: Oct. 15, 1974

[21] Appl. No.: 514,399

[30] Foreign Application Priority Data

Oct. 26, 1973 Switzerland ............. 15150/73

[52] U.S. Cl. ..................... 426/431; 426/542
[51] Int. Cl.² .......................... A23L 1/28
[58] Field of Search ......... 426/425, 431, 459, 460, 426/464, 477, 488, 489, 507, 542

[56] References Cited

UNITED STATES PATENTS

| | | | |
|---|---|---|---|
| 46,973 | 3/1865 | Percy | 426/431 X |
| 978,476 | 12/1910 | Nilson | 426/431 X |
| 1,088,741 | 3/1914 | Stephens | 426/431 X |
| 1,717,869 | 6/1929 | Blumenthal | 426/431 X |
| 2,058,162 | 10/1936 | Macke | 426/542 |
| 2,382,242 | 8/1945 | Lindow | 426/542 X |
| 2,515,860 | 7/1960 | Buxton | 426/542 |
| 2,816,032 | 12/1957 | Meyer | 426/431 X |
| 3,497,362 | 2/1970 | Dution | 426/542 |
| 3,532,504 | 10/1970 | Flesch | 426/431 X |
| 3,628,971 | 12/1971 | Kavchnar | 426/542 X |
| 3,732,111 | 5/1973 | Bernes | 426/542 |

FOREIGN PATENTS OR APPLICATIONS 2,009,302  9/1971  Germany .............. 426/431

OTHER PUBLICATIONS

Chem. Abst.–56, 13310e, col. 2.
Chem. Abst., 50, 1228i, 1229a.

*Primary Examiner*—Robert Halper
*Attorney, Agent, or Firm*—Watson Leavenworth Kelton & Taggart

[57] ABSTRACT

Antioxidant substances are disclosed. These substances are obtained by extraction of an organic plant material with an aqueous basic solution having a pH-value of from 7 to about 11.5, separation of insoluble material, and collection of the soluble fraction containing the antioxidant substances.

9 Claims, No Drawings

PROCESS FOR EXTRACTING ANTIOXYDANTS

This invention relates to a process for extracting antioxidant substances, to the antioxidant substances thus extracted and to their use.

One feature common to all conventional processes for extracting antioxidant substances from a vegetable material is that they include a stage in which the antioxidant substances are dissolved. Organic solvents or vegetable or animal oils are used for this purpose. Apart from the fact that some of these products are dangerous to handle and relatively expensive for industrial application, they can prove difficult to remove after use and, hence, contaminate the antioxidant substances obtained. However, their major disadvantage is that they are not selective enough and also extract numerous undesirable substances. For example, ethanol readily extracts chlorophyll from vegetable materials in which it is present, and if in addition this vegetable material is an aromatic plant most of the fragrant ingredients of that plant will not fail to enter into organic solution. Accordingly, it is highly desirable, before extracting the antioxidant substances, to subject the organic material to a deodorising pretreatment by extraction with a substantially non-polar solvent, by distillation, by entrainment with steam or by gas-phase stripping of the volatile compound responsible for the odour. The disadvantages inherent in this kind of pretreatment are obvious: loss of some of the antioxidant substances by partial extraction or heating of the organic material and, hence, of the antioxidant substances, etc., without taking into account the cost inherent in any technological operation.

It has been proposed to eliminate the need for this pretreatment by directly extracting the antioxidant substances with an aqueous soda solution. All the attempts made in this direction, using relatively concentrated solutions with pH values above 13, have proved unsuccessful, because most of the antioxidant substances are phenolic in nature and are not readily compatible with extreme basic pH values in the presence of air and cellular enzymatic systems. Extraction with aqueous soda solutions is accompanied by oxidation and condensation of which the main effect is to eliminate the antioxidant properties and, at the same time, to give rise to heavy undesirable discoloration.

The present invention obviates these difficulties whilst having the advantage of being particularly simple to put into practice. The invention relates to a process for extracting antioxidant substances from an organic material containing them, distinguished by the fact that the organic material is treated with a basic aqueous solution with a pH value in the range from 7 to about 11.5, the insoluble fraction is separated and the soluble fraction containing the antioxidant substances is collected. The invention also relates to the antioxidant substances obtained and to their use.

At the present level of knowledge, organic materials containing antioxidant substances are found exclusively in the vegetable kingdom among the lower vegetables such as, for example, bacteria, fungi, lichens, and among the higher vegetables. In this connection, it is pointed out that almost every plant of the Labiatae family, rosemary, sage, origanum or marjoram, thyme, etc., contain appreciable quantities of antioxidant substances, as do numerous plants of the Umbelliferae family such as parsley, chervil, fennel, celery, and various plants belonging to other families, for example the clove tree, the pimento or the pepper plant. Depending on whether the distribution of antioxidant substances in the vegetable is uniform or whether, by contrast, these substances are localised in precise organs such as flowers, fruit, roots, rhizomes, thalli, etc., either the whole vegetable or, with advantage, only the aforementioned organs will be treated as organic material.

A basic aqueous solution is by definition a solution with a pH-value above 7. The pH range of interest so far as the invention is concerned is only the range from 7 to the pH-value beyond which the oxidation and discoloration phenomena referred to above appear. This pH-value is of course dependent upon the organic material treated, although its average is in the vicinity of 11.5.

In one particularly advantageous variant, the upper pH-value is in the vicinity of pH 10 so that a soluble fraction with an optimum antioxidant capacity is obtained. The reason for this is that certain phenolic derivatives weakly acid in character so that they cannot be extracted at pH-values in the range from 7 to about 10 are substances which, far from being antioxidant, are in fact pro-oxidant. Consequently, if the organic material to be treated contains pro-oxidant substances of this kind, the only substances which will be extracted at pH-values in the range from 7 to about 10 will be the desirable substances, i.e. in the present case substances with a relatively more pronounced acid character such as, for example, substances with one or more carboxyl functions in their substance. Rosemary is a particularly suitable case for illustrating this point: this organic material, treated at a pH-value of 8.5, gives a soluble fraction rich in phenolic acids, such as carnosic acid and rosmarinic acid, except for purely phenolic compounds such as flavones which are pro-oxidant substances and would be extracted at pH-values above 10 by a conventional process, for example with alcohol.

In order during treatment to prevent the pH-value from exceeding the limits defined above, it is preferred to apply conditions of constant basicity using a suitable buffer solution. Commercially interesting buffer solutions are normally solutions based on alkali metal or alkaline earth metal salts such as, for example, the bicarbonates of sodium and potassium and disodium phosphate.

According to the invention, the treatment is carried out by bringing the organic material and the aqueous basic solution into contact with another. In order to provide for as large a solid-liquid contact surface as possible whilst at the same time maintaining wettability at an adequate level, it is advisable for the organic material to be in a suitably divided form. If this is not the case, it is advisable to grind it or to size-reduce it into particles preferably from 1 to 3 mm in size according to circumstances.

In order to facilitate grinding or size-reduction, it may be of advantage to partially dry the material. Drying can readily be carried out at moderate temperature, for example in a chamber with hot air circulating inside it. The optimum contact time depends upon the organic material treated and upon the pH-value of the aqueous basic solution used. It is frequently between 1 and 3 hours for pH-values of the order of 8.5. However, it it important to ensure that the two solid and liquid phases do not remain in contact with one another for too long, because gradually undesirable substances can begin to enter into solution. The pressure under which extraction is carried out is not an important factor, except that it enables aqueous basic solutions to be used if necessary at temperatures above 100° C. Extraction is normally carried out at atmospheric pressure, i.e. at a temperature in the range from 0° to about 100° C. An optimum temperature is determined in dependence upon the particular organic material and the type of aqueous basic solution used (especially its pH-value), with a view to obtaining an adequate extraction yield without, at the same time, causing too many undesirable substances or, simply, substances foreign to the antioxidant properties to enter into solution. In many cases, this optimum temperature is in the range from 40° to 90° C. In one preferred variant, the treatment is carried out in an inert atmosphere, for example under nitrogen or a rare gas, in order to minimise the degree of discoloration which, for a contact time of 2 hours for example can occur in spite of the precautions taken to strictly control the pH-value. This discoloration is partly due to the enzymatic oxidation of various substances present in the organic material. The absence of oxygen obviously limits the phenomenon. If, in spite of everything, the discoloration of the soluble phase obtained is considered excessive and/or if this phase has an unpleasant odour so far as its ultimate application is concerned, a complementary decolouring and/or deodorising treatment is carried out in another variant of the process according to the invention. Finally, so far as the separation of the soluble and insoluble phases is concerned, it can be effectively carried out by any known method such as, for example, decantation or filtration. In order to avoid premature crystallisation phenomena it is advisable either to carry out separation at a temperature which is not too far below the extraction temperature, above all when working under near-saturation conditions, or to wait until the suspension has been suitably cooled and balanced at ambient temperature.

The process according to the invention can be carried out in different ways. Thus, the organic material can be contacted with the aqueous basic solution in extractors by the preferably complete immersion of individual batches of solids in the solution, advantageously accompanied by vigorous agitation in order to obtain a homogeneous suspension. If necessary, the batch of organic material thus treated may be reimmersed one or more times in a subsequent volume of fresh aqueous basic solution. In this particular embodiment, the total volume of solution used for one or more immersions generally corresponds to a weight far in excess of (10 to 20 times greater than) the weight of the organic material treated. These values are purely indicative and can vary greatly according to the organic material and the aqueous basic solution used. In addition, if contacting is carried out with a battery of as many extractors as there are individual batches, it is possible with advantage to use the soluble fraction obtained in the extraction of a first batch as the aqueous basic solution for the extraction of a second batch, and so on. If then each batch is treated with several volumes of solution renewed between each operation, the throughflow order of these solutions will preferably be reversed between two successive operations so that it is not always the same batch which is the first to receive the fresh aqeuous basic solution.

In another embodiment, the aqueous basic solution is circulated in a chamber accommodating the organic material. In one variant of this embodiment, the organic material is mobile and moves in countercurrent to the aqueous basic solution. In these two cases, the ratios by weight of solution to solids have to be determined, all other things being equal, in dependence both upon the relative solidliquid displacement velocity and upon the recycling techniques envisaged.

Finally, in cases where an inert atmosphere is applied, the gas is with advantage injected through the aqueous basic solution, preferably beginning 1 to 2 hours before it is brought into contact with the organic material in order adequately to deoxygenate the aqueous basic solution.

The optional treatment of the soluble fraction can effectively be carried out in several ways such as, for example, by return extraction, in which case the soluble fraction is emulsified with an organic solvent, for example methylene chloride, and then separated after decantation. It is also possible to apply a treatment with active carbon, or a combination of treatments of the kind to which reference has just been made. In the case of deodorisation alone, it is possible for example to bubble a gas, if necessary an inert gas, through the soluble fraction at suitable temperatures and pressures, the volatile substances being gradually entrained by the gas. In some cases, it may be sufficient simply to apply a vacuum.

As already mentioned, the antioxidant substances extracted in accordance with the invention are acid in character. They are obtained dissolved in the aqueous basic solution, i.e. in the form of salts.

Although it would be quite possible to use this soluble fraction as such, it is occasionally preferred to eliminate the water and to recover the antioxidant substances in dry form (especially where storage is envisaged). It is possible in this way to obtain a relatively hydrosoluble mixture of antioxidant substances and mineral salts. If necessary, the salts can be eliminated by any suitable method such as, for example, crystallisation or treatment on an ion-exchange resin.

If it is desired to recover liposoluble antioxidant substances, it is sufficient to destroy their salt character by acidification to a minimum pH-value of the order of 2, although this may vary from one case to another. This is readily achieved by adding to the soluble fraction a mineral or organic acid, for example hydrochloric acid, taking certain precautions, especially where a bicarbonate buffer has been used. Depending upon the concentration of this soluble fraction, the antioxidant substances will precipitate and their isolation will only necessitate straightforward filtration, or will not precipitate, in which case the liquid phase may be concentrated until the substances precipitate, or even to dryness. Alternatively, they may be extracted with a water-immiscible organic solvent such as, for example, petroleum ether or methylene chloride. In one variant, the liquid phase is concentrated before acidification.

It is of course possible to carry out partial acidification, for example at pH 6, followed by drying, and in this way to obtain partly hydrosoluble and partly liposoluble antioxidant substances.

In one advantageous variant, partial or complete acidification is only carried out during incorporation into the oxidisable materials.

Another significant advantage of the process according to the invention is that it is possible to isolate antioxidant substances whose hydrosolubility and liposolubility can be adjusted in dependence upon the applications envisaged for them.

Incorporation of the antioxidation substances into oxidisable materials, such as food-grade materials, can be effectively carried out by any known means, for example in solution or suspension or emulsion in solvents or liquefied gases or the like, i.e. with the aid of a vehicle.

The antioxidant substances can obviously be added in admixture with other substances, especially and with considerable advantage in admixture with so-called secondary antioxidant substances. These are substances which, like ascorbic acid, tartaric acid, citric acid or ethylenediamine tetraacetate have a chelating effect with respect to pro-oxidant substances of the medium or which, like the ascorbate, metabisulphite or pyrophosphate of sodium, reduce the redox potential of the medium. In addition, the choice of a vehicle containing, for example, an acid of the kind referred to above, will enable the antioxidant substances to be partly acidified without having to resort to foreign substances.

The following Examples illustrate the application of the process according to the invention, the following Table summarising the principal parameters relating to the various extractions described in detail in those Examples:

| Example | Organic Material | Aqueous basic solution Type | pH | Atmosphere | Contact time in hours | Treatment temperature in °C |
|---|---|---|---|---|---|---|
| 1 | rosemary | $NaHCO_3$ | 8.6 | $N_2$ | 3 | 55° C |
| 2 | rosemary | $NaHCO_3$ | 8.6 | air | 2 | 90° C |
| 3 | rosemary | $KHCO_3$ | 8.7 | air | 2.5 | 65° C |
| 4 | rosemary | $Na_2HPO_4$ | 9.3 | $N_2$ | 2 | 55° C |
| 5 | sage | $NaHCO_3$ | 8.6 | $N_2$ | 1.75 | 55° C |
| 6 | parsley | $NaHCO_3$ | 8.6 | air | 2 | 60° C |

EXAMPLE 1

5 kg of rosemary needles dried, ground and sifted (particle diameter approximately 3 mm) are added with vigorous stirring in a nitrogen atmosphere to 50 liters of a sodium bicarbonate buffer solution of pH 8.6 (approximately 4% aqueous solution) previously de-aerated for 2 hours by bubbling through a stream of nitrogen. The mixture is then heated to 55° C with continued stirring to maintain a homogeneous suspension. After 3 hours, the two phases are rapidly separated in a de Laval centrifuge. There are thus recovered 12 kg of grounds which are discarded and 43 kg of extract which are concentrated to 6 kg in a Luwa evaporator at a temperature of 40° C. After drying for 12 hours at 45° C in a Passburg dryer, the product is size-reduced in a Frewitt mill into particles with a diameter of approximately 1 mm. There are thus obtained 1.61 kg of powder of extract of rosemary, yellowish-green in colour, with a very slight odour of rosemary.

450 kg of potato slices are then prepared by precooking for 15 minutes at 70° C, followed by sudden cooling by countercurrent washing with water at 10° C for a period of 15 minutes. These slices are then cooked for 30 minutes at 100° C. A solution of 45 g of the powdered extract of rosemary prepared as described above in 6 liters of water is then added followed, after mixing, by the addition of 24 liters of an emulsion containing 1.8 kg of sodium stearate, 90 g of sodium pyrophosphate, 90 g of citric acid and 300 g of sodium metabisulphite. After careful homogenisation, the product is dried on a central rotary cylinder equipped with 5 planet cylinders, the central cylinder is heated by steam under a pressure of 6.5 atmospheres, the interval between the planet cylinders varying from 6 to 8 mm. In this way there is obtained a film of puree with a solids content of 93% containing 450 ppm of antioxidant substances based on its solids content. This puree is packed in flake form into non-gassed metal cans.

After 3 months, the carotenoid content (oxidation indicators) of the flakes thus prepared is measured in preservation tests. These tests show that 66.0% of the carotenoids originally present remain. For comparison, a sample of a puree prepared and canned in the same way, but not protected by the addition of antioxidant substances, contains no more than 34.4% of its orginal carotenoids.

EXAMPLE 2

5 kg of rosemary needles dried, ground and sifted (particle diameter approximately 2 mm) are treated with 50 liters of a non-deaerated, approximately 4% sodium bicarbonate solution of pH 8.6 in the same way as described in Example 1, but at a temperature of 90° C, over a period of 2 hours and without the stream of nitrogen. After separation in de Laval centrifuge, 12.5 kg of grounds and 36.7 kg of extract are collected. The grounds are discarded, and the extract concentrated and then dried in the same way as described in Example 1. Grinding gives 2.15 kg of powder of extract of rosemary, yellowish-green in colour, with a very faint odour of rosemary.

450 kg of cooked potato slices are then prepared in the same way as described in Example 1. In addition, 6 liters of an aqueous solution of 45 g of powdered rosemary extract prepared as described above are mixed with 24 liters of the emulsion described in Example 1. The product is homogenised by vigorous agitation so that, the emulsion having a pH-value of the order of 6, at least some of the antioxidant substances of the extract are converted into liposoluble form. This mixture is then added to the cooked potato slices, after which preparation of the flakes of puree is finished in the same way as described in Example 1. Even after 3 months storage, these flakes still contain 62.5% of their original carotenoids.

EXAMPLE 3

5 kg of rosemary needles dried, ground and sifted (particle diameter approximately 1.5 mm) are extracted with 50 liters of a non-deaerated, approximately 4% potassium bicarbonate solution of pH 8.7 in the same way as described in Example 1, but without a stream of nitrogen and at a temperature of 65° C. After 2.5 hours, the two phases are separated in a de Laval centrifuge, giving 12.5 kg of grounds and 36 kg of extract which, concentrated and dried in accordance with Example 1, yields 4.35 kg of extract of rosemary powder yellowish-green in colour with a water content of 6.3%.

The antioxidant power of this powder is measured by Marco's method which is described in detail in J. Am. Oil. Chem. Soc. 45,594 (1968). However, it is worth recalling here that a factor K is determined from the decolouration of a triple emulsion of linoleic acid, $\beta$-carotene and water saturated with oxygen. By definition, the factor K is equal to 1 for this emulsion. The decolouration of similar emulsions containing the substances to be tested is then measured. A value K < 1 signifies that these substances are pro-oxidant, whilst a value K > 1 signifies that they are antioxidant. The extract of rosemary powder prepared as described above has a K value of approximately 3.

An extract with very similar characteristics, but slightly more pale, is obtained by extracting for 3 hours at 60° C in a nitrogen atmosphere with the same solution previously deaerated with a stream of nitrogen.

EXAMPLE 4

5 kg of rosemary needles dried, ground and sifted are treated in accordance with Example 1 with 50 liters of a solution in water of 2 kg of disodium phosphate dodecahydrate of pH 9.3. Extraction is carried out in the same way as in Example 1 over a period of 2 hours at 55° C in a nitrogen atmosphere. After separation, 12.5 kg of grounds and 43.3 kg of extract are recovered. When treated in accordance with Example 1, the extract yields 1.34 kg of extract of rosemary powder, against yellowish-green in colour, with a water content of 8.2% and a very faint odour of rosemary. The antioxidant power of this powder is similar to that of the powder of Example 3 (equal solids contents).

EXAMPLE 5

5 kg of sage leaves dried, ground and sifted (particle diameter approximately 2 mm) are treated as in Example 1 with 50 liters of an aqueous solution of 2 kg of sodium bicarbonate of pH 8.6. As in Example 1, extraction is carried out for 1.75 hours in a nitrogen atmosphere at a temperature of 55° C. 11.5 kg of grounds and 40.4 kg of extract are collected after separation. After concentration and drying in accordance with Example 1, the extract yields 1.35 kg of extract of sage powder containing 4.6% of water. This powder is yellowish-green in colour and has a faint residual odour of sage. Its antioxidant power is similar to that of the rosemary powders of Examples 1 to 4.

EXAMPLE 6

5 kg of parsley dried, ground and sifted (particle diameter approximately 2 mm) are treated in accordance with Example 1 with 50 liters of the bicarbonate solution of Example 5 (pH 8.6) in non-deaerated form. Extraction is carried out for 2 hours at 60° C without a stream of nitrogen, and 12.5 kg of grounds and 44.3 kg of extract are obtained after separation. This extract is concentrated and dried as described in Example 1, yielding 2.5 kg of extract of parsley powder with a water content of 8.9% which is reduced to 2.6% by drying for 3 hours at 60° C. This powder is pale yellow in colour and has hardly any odour. Its antioxidant power is approximately one half to one third of that of the extract of rosemary or sage powders of Examples 1 to 5.

I claim:
1. A process for extracting antioxidant substances from an organic plant material of the Labiate or Umbellifer family containing them, wherein the organic material is treated with an aqueous basic buffer solution with a pH value of from 7 to about 11.5, the insoluble fraction is separated and the soluble fraction containing the antioxidant substances is collected.

2. a process as claimed in claim 1, wherein the buffer solution is a sodium bicarbonate solution.

3. A process as claimed in claim 1, wherein the buffer solution is a potassium bicarbonate solution.

4. A process as claimed in claim 1, wherein the buffer solution is a disodium phosphate solution.

5. A process as claimed in claim 1, wherein extraction is carried out at a temperature in the range from 40° to 90° C.

6. A process as claimed in claim 1, wherein extraction is carried out under a nitrogen atmosphere.

7. A process as claimed in claim 1, wherein the soluble fraction is treated to eliminate the mineral salts.

8. A process as claimed in claim 1, wherein the soluble fraction is acidified.

9. A process as claimed in claim 8, wherein the antioxidant substances are extracted from the acidified soluble fraction with an organic water-immiscible solvent.

* * * * *